(12) United States Patent
Galimberti et al.

(10) Patent No.: US 7,602,724 B2
(45) Date of Patent: Oct. 13, 2009

(54) METHOD AND APPARATUS FOR TRANSMITTING CIRCUITRY THAT TRANSMIT DATA AT DIFFERENT RATES

(75) Inventors: Gabriele Maria Galimberti, Bovisio Masciago (IT); Roberto Gianella, Settimo Milanese (IT); Marco Portinari, Bresso (IT); Paolo Sironi, Gallarate (IT)

(73) Assignee: Cisco Technology, Inc., San Jose, CA (US)

( * ) Notice: Subject to any disclaimer, the term of this patent is extended or adjusted under 35 U.S.C. 154(b) by 540 days.

(21) Appl. No.: 11/273,998

(22) Filed: Nov. 14, 2005

(65) Prior Publication Data

US 2007/0109970 A1    May 17, 2007

(51) Int. Cl.
H04L 12/26    (2006.01)
(52) U.S. Cl. ..................................... 370/236
(58) Field of Classification Search ................ 370/230, 370/235, 236
See application file for complete search history.

(56) References Cited

U.S. PATENT DOCUMENTS 7,369,496 B1 * 5/2008 Wiggins et al. ............. 370/235

2005/0182848 A1 * 8/2005 McNeil et al. .............. 709/235

OTHER PUBLICATIONS

Malhotra et al., 'Modeling the interaction of IEEE 802.3x hop-by-hop flow control and TCP end-to-end flow control', Next Generation Internet 2005, Apr. 18-20, 2005, pp. 260-267.*
IEEE Std 802.3, 1998 Edition, Part 3: Carrier sense multiple access with collision detection (CSMA/CD) access method and physical layer specifications, Annex 31B Mac Control Pause operation, pp. 1206-1215.*
International Search Report sent Aug. 7, 2008 for PCT Application No. PCT/IB06/03250.
Written Opinion sent Aug. 7, 2008 for PCT Application No. PCT/IB06/03250.

* cited by examiner

*Primary Examiner*—Melvin Marcelo
(74) *Attorney, Agent, or Firm*—Weaver Austin Villeneuve & Sampson LLP (57) ABSTRACT

A system for transmitting data to a first circuit that transmits and receives data at a first rate from a second circuit that transmits data at second rate that is greater than the first rate. This invention includes an interface that transmits pause frames to the second circuit in response to an event in order to halt transmission from the second circuit to the first circuit. The second circuit then halts transmitting data until a message to resume transmission is received.

28 Claims, 7 Drawing Sheets

METHOD AND APPARATUS FOR TRANSMITTING CIRCUITRY THAT TRANSMIT DATA AT DIFFERENT RATES

FIELD OF THE INVENTION

This invention relates to transmitting data between circuits that have different transmission rates. More particularly, this invention relates to interface that controls the flow of data between the circuits. Still more particularly, this invention relates to an interface which transmits pause frames to a circuit that transmits at a greater rate when data store in buffers in either the interface or the slower circuit is greater than a threshold capacity.

PRIOR ART

It is a problem in many digital communications design to transmit data between two circuits that transmit data at different rates and/or different duty cycles. For example, a router or other switching system may have a connection to the Internet or other network over a ADSL connection which transmits at a rate of 32 kbits/sec. The router may then transmit data over a connected Local Area Network (LAN) via a Ethernet with a transmission rate of 100 Mbits/sec. In order to transmit data from one circuit to the other circuit a back pressure mechanism is needed.

Back pressure is a process by which the data being transmitted from the circuit that transmits at a higher rate is slowed or stopped to allow the circuit that transmits at the slower rate to receive and process the data. Two prior art applications for providing back pressure are Carrier Sense Deferral System (CRS) and Pause Frames/Recovery Frames. Both of these systems use designated packets sent from the slower circuit to the faster circuit to cause the faster circuit to pause transmission.

CRS in most applications implies a half duplex mode. The half duplex mode causes performance degradation. The protocol between the interfaces of the devices can SMII (Serial Multimedia Independent Interface) GMII, RMII or any other multimedia interface). The pause frames and recover frames generally require large receiver buffers and a greater latency of transmission. Both of these solutions cause performance degradation. Thus, there is a need in the art for a better system for providing back pressure while minimizing performance degradation.

SUMMARY OF THE INVENTION

The above and other problems are solved and an advance in the art is made by a system for transmitting data between two circuits that transmit data at different rates in accordance with this invention. A first advantage of a system in accordance with this invention is that the system provides a low cost process for providing back pressure. A second advantage of this invention is that the system provides a back pressure with low latency. A third advantage is the system does not cause performance degradation. Furthermore, a fourth advantage of a system in accordance with this invention is that back pressure is provided with no shaping or scheduling of data being transmitted between the two circuits.

In accordance with this invention, a system for transmitting data between two circuits that transmit data at different rates is configured in the following manner. A first circuit transmits and receives data at a first rate. A second circuit transmits and receives data at a second rate. The second rate for transmitting data is greater than the first rate. In accordance with this invention, an interface circuit receives data packets transmitted from the second circuit to the first circuit. The interface stores each packet received from the second circuit in a buffer. The buffer is monitored by the interface to determine when the amount of data stored in the buffer is greater than a maximum threshold capacity. In response to the amount of data being stored being greater than the maximum threshold capacity, the interface transmits a pause request to the second circuit. The second circuit receives the pause frame and halts transmission of data packets to the first circuit.

In accordance with this invention, the interface may then monitor the buffer and determines if the amount of said data in the buffer is less than a minimal capacity threshold. In response to the amount of data being less then the minimal capacity threshold, the interface transmits a recovery request to the second circuit. The second circuit receives the recovery request, and resumes transmitting data to first circuit.

In accordance with this invention, the second circuit may complete transmission of a currently transmitted packet after receiving the pause request. The second circuit then halts transmission of packets to the first circuit. The second circuit may then store packets generated for transmission to the first circuit until a recovery request is received. The second circuit then transmits each packet from the buffer to the first circuit responsive to receiving the recovery request.

In accordance with some embodiments of this invention the interface circuit may complete transmission of a currently transmitted packet from the first circuit to the second circuit responsive to a determination whether the amount of data in the buffer of the interface is greater than the maximum capacity threshold. The interface then transmits the pause request after completing of the transmission of the currently transmitted packet.

In accordance with other exemplary embodiments of this invention, the interface circuit may transmit packets from the first circuit to the second circuit in the following manner. The interface circuit first transmits a pause request to the second circuit. One packet of data transmitted from the first circuit is then transmitted to the second circuit. After the packet is transmitted from the interface to the second circuit, the interface circuit transmits a recovery request to the second circuit.

In accordance with still other exemplary embodiments of this invention, the interface circuit may be configured to operate in the following manner. The interface circuit receives a transmission from the first circuit indicating an amount of data stored in a buffer for storing received data in the first circuit is greater than a maximum capacity threshold. The interface circuit then transmits a pause request to the second circuit in response to receiving the transmission. The interface circuit then receives a transmission from the first circuit indicating an amount of said data in the buffer for storing received data is below a minimum threshold. The interface circuit then transmits a recovery request to the second circuitry in response to receiving the transmission.

BRIEF DESCRIPTION OF THE DRAWINGS

The above and other features and advantages of this invention are described in the following detailed description and are shown in the following drawings.

DETAILED DESCRIPTION

This invention relates to transmitting data between two circuits that transmit data at different rates. For purposes of clarity, the same components are given the same reference numerals in the varying drawings.

Figure 1:
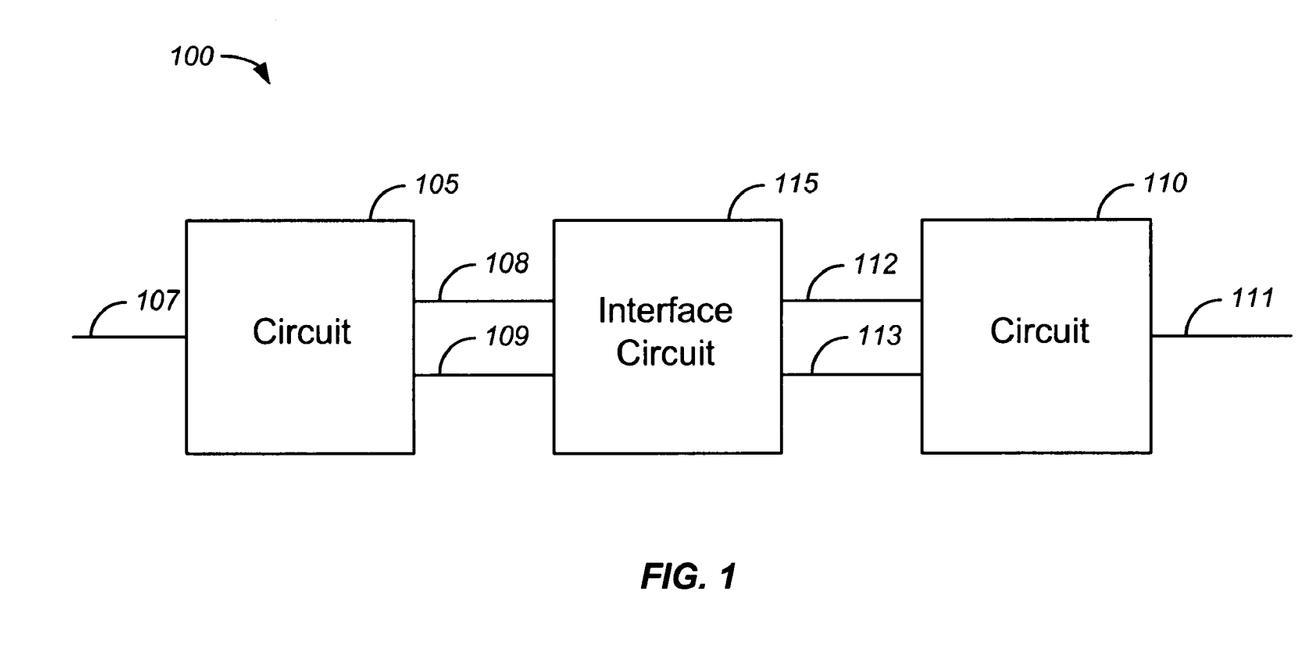
FIG. 1 illustrating a block diagram of components of a system that includes a system for transmitting data between circuits in accordance with this invention.

FIG. 1 illustrates the components in a communication system 100 that perform the processes for providing a system in accordance with this invention. Circuit 105 is a first circuit that transmits data at a first rate. In an exemplary embodiment, circuit 105 is an ADSL circuit for transmitting data from device over telephone line 107 to a second device. In Typical ADSL circuit, data is transferred at a rate of 25 Mb/sec. Circuit 105 receives data from second circuit 110 over input path 108 and transmits data to second circuit 110 via output path 109. One skilled in the art will recognize that input path 108 and output path 109 may be separate connections or may be single bus for transmitting data. One skilled in the art will further recognize that this invention requires little or no modification of first circuit 105. A more complete description of first circuit 105 is shown FIG. 2 and described below.

Second circuit 110 is circuitry that transmits data at a second rate. The second rate is greater than the first rate of first circuit 105. Second circuit 110 may be a port of a routing system, module in a routing system, or the entire routing system. In an exemplary embodiment, second circuit 110 is a layer 2 switch that transmits data at a rate of 100 Mb/sec. Second circuit 110 transmits data to other circuits in the system via path 111. Second circuit 110 transmits data to first circuit 105 via output path 112 and receives data from first circuit 105 via input path 113. One skilled in the art will recognize that paths 112 and 113 may be separate connections for transmitting data, may be a single connection that is duplexed to transmit data between circuits, or any other single path used for bi-directional communications. One skilled in the art will further recognize this invention requires little or no modification of second circuit 110. A more complete description of second circuit 110 is shown FIG. 3 and described below.

Interface 115 is a circuit that connects paths 108 and 109 to paths 112 and 113. Interface circuit 115 is circuitry that slows the transmission of data from second circuit 110 so that the data may be received by first circuit 105. Interface 115 is a Field Programmable Gate Array (FPGA) or other configurable circuit that can be programmed to perform as an interface between first circuit 105 and second circuit 110. A more complete description of interface 115 is shown FIG. 4 and described below.

Figure 2:
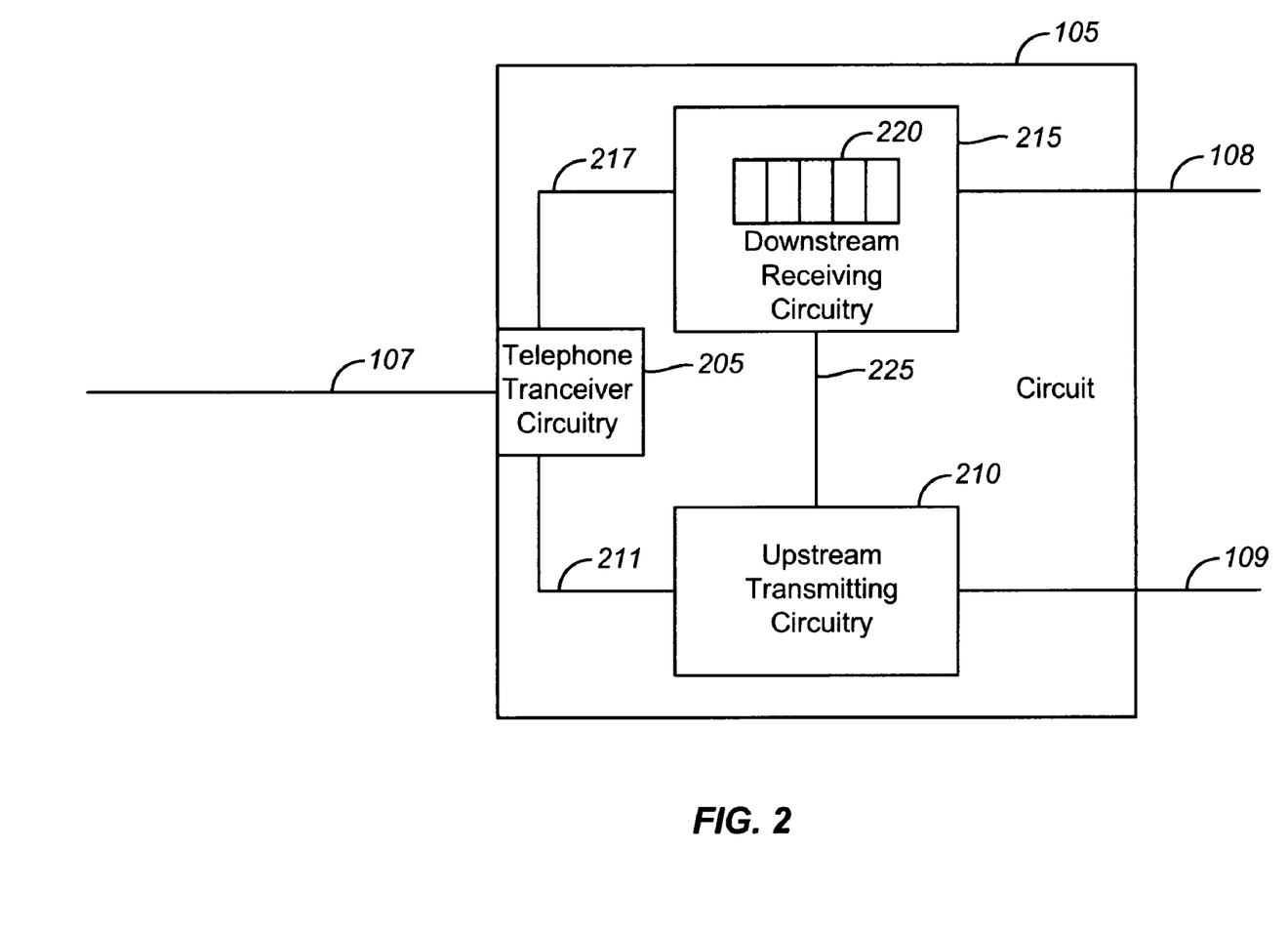
FIG. 2 illustrating a block diagram of components in an exemplary embodiment of a first circuit having a first data rate.

FIG. 2 illustrates a block diagram of the components of an exemplary embodiment of first circuit 105 needed to understand the invention. One skilled in the art will recognize that first circuit 105 may by an FPGA configured to perform these applications or any combination of software and circuitry that may be used to perform the described functions. First circuit 105 includes telephone transceiver circuitry 205, upstream transmitting circuitry 210, and downstream receiving circuitry 215. Telephone transceiver circuitry 205 connects to telephone transmission line 107. Telephone transceiver circuitry 205 receives and transmits data over telephone transmission line 107 and translates any protocols necessary for transmission of data.

Telephone transceiver circuitry 205 receives data for transmission for downstream receiving circuitry 215 via path 217. Telephone transceiver circuitry 205 also transmits data for transmission to upstream transmitting circuitry 210 via path 211. Downstream receiving circuitry 215 receives data from second circuit 110 via path 108. Data is typically received in packets, the packets are stored in buffer 220 for processing. Downstream receiving circuitry 215 also includes circuitry that monitors the amount of data stored in buffer 220. When buffer 220 exceeds a threshold capacity, downstream receiving circuitry transmit a signal to upstream transmitting circuitry 210. As described below, upstream transmitting circuitry generates a CRS signal that is transmitted via path 109 to interface 115 as described below.

Figure 3:
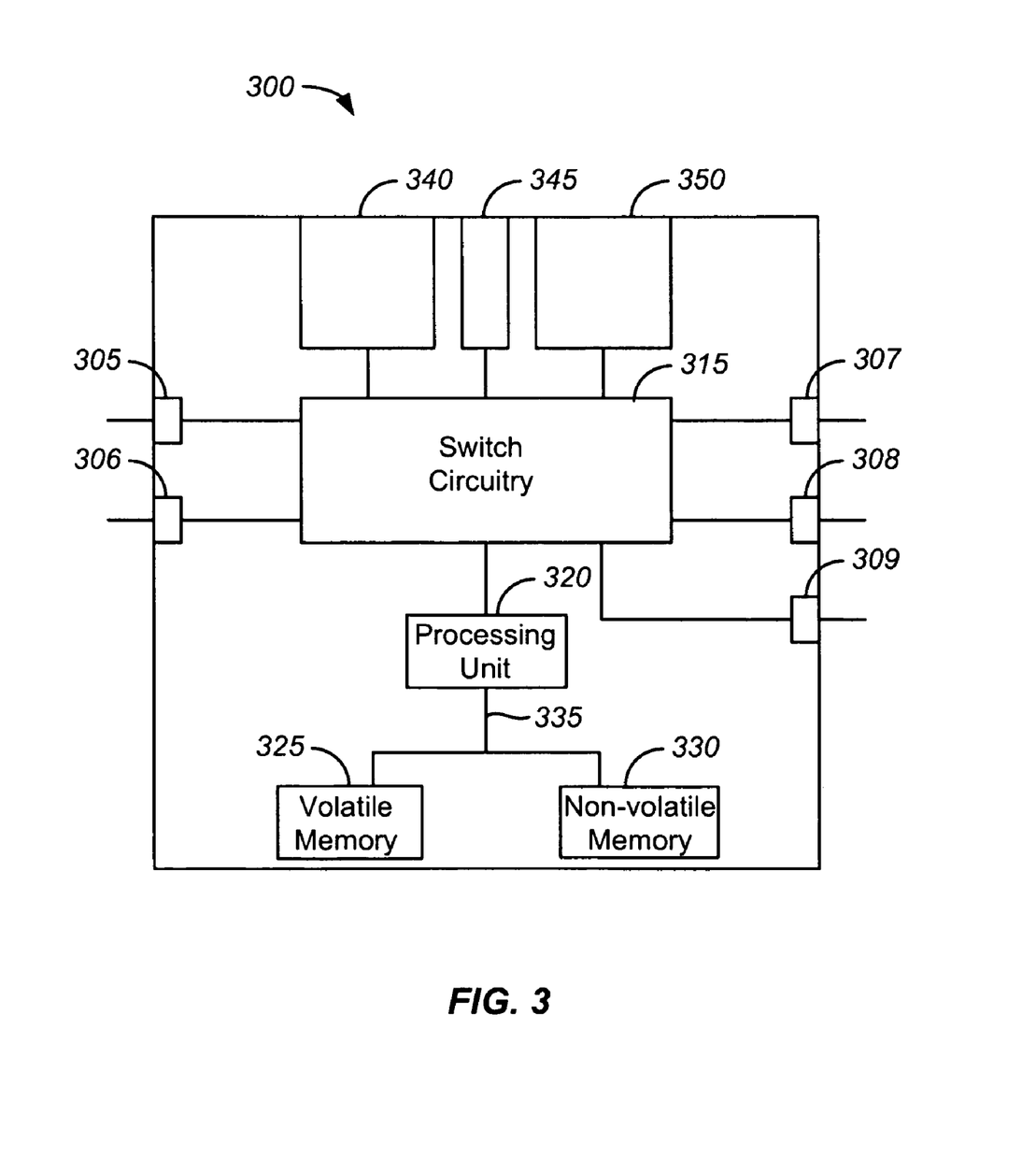
FIG. 3 illustrating a block diagram of components in an exemplary embodiment of a second circuit having a second data rate that is greater than said first data rate.

FIG. 3 illustrates a routing system 300 that may include second circuit 110. Router 300 is a switching system that transmits digital data, in the form of packets between processing systems connected to a network. One skilled in the art will recognize that router 300 may be a router, switch or any other processing system that receives and transmits digital data. In accordance with this invention, ports 305-309 or modules 340, 345, and 350 may be second circuit 110. All that is required is that the circuit be transmitting data to first circuit 105 over a connected path.

Router 300 includes ports 305-309. Ports 305-309 connect router 300 to other processing system in a network. The other processing systems that may be connected include computers, other routers or any other digital processing systems. One skilled in the art will further recognize that ports 305-309 are shown for exemplary purposes only and the exact number and configuration of the ports are left to one skilled in the art designing a specific router.

Ports 305-309 are connected to switch circuitry 315. Switch circuitry 315 is circuitry that transmits received packets to the proper ports for delivery to the proper address. One skilled in the art will recognize that there are many different types of circuitry that may be used to transmit packets between proper ports and an explanation of the switching circuitry is not critical to this invention and is omitted for brevity.

Processing unit 320 is connected to switching circuitry 315. Processing unit 320 is a processor, microprocessor, or any combination of processors and microprocessors that execute instructions to perform applications for performing functions in router 100. Processing unit 320 is also connected a volatile memory 325 and a non-volatile memory 330 via memory bus 335.

Volatile memory 325 is a memory such as a Random Access Memory (RAM). A volatile memory stores instructions and data used by processing unit 320 to perform applications. One such application is a router operating system. The routing operating system is an application which allows router 300 to perform other applications that provide the functions of router 300. An example of a router operating system is Inter-network Operating System (IOS) designed by Cisco Systems Inc. One Skilled in the art will recognize that many different types of memory may be used a non-volatile memory such SRAM and DRAM.

Non-volatile memory 330 is a memory such as a Read Only Memory (ROM). Non-volatile memory 330 stores configuration and other vital information for router 300. One skilled in the art will recognize that there are many different types of memory that may be used as a non-volatile memory.

Modules 340, 345, and 350 are connected to switching circuitry 315. Modules 340,345, and 350 are device and/or software that perform specific features in router 300. An example of a module is a Voice Over Internet Protocol (VoIP) module for providing telephonic communications to processing devices connected to router 300. One skilled in the art will recognize that the number of modules and the functions each module provides may be determined by one skilled in the art designing a particular router.

This invention is a method for managing the transmission of data between the first and second circuits having different transmission rates. This invention uses pauses and recovery requests that may be pause and recovery frames already used in the art. This invention generates the pause frames when a buffer in the interface is above a threshold. In some embodiments, pause and recovery frames may be generated before and after each packet transmitted to the second, faster circuit to reduce the chance of the threshold being surpassed.

Figure 4:
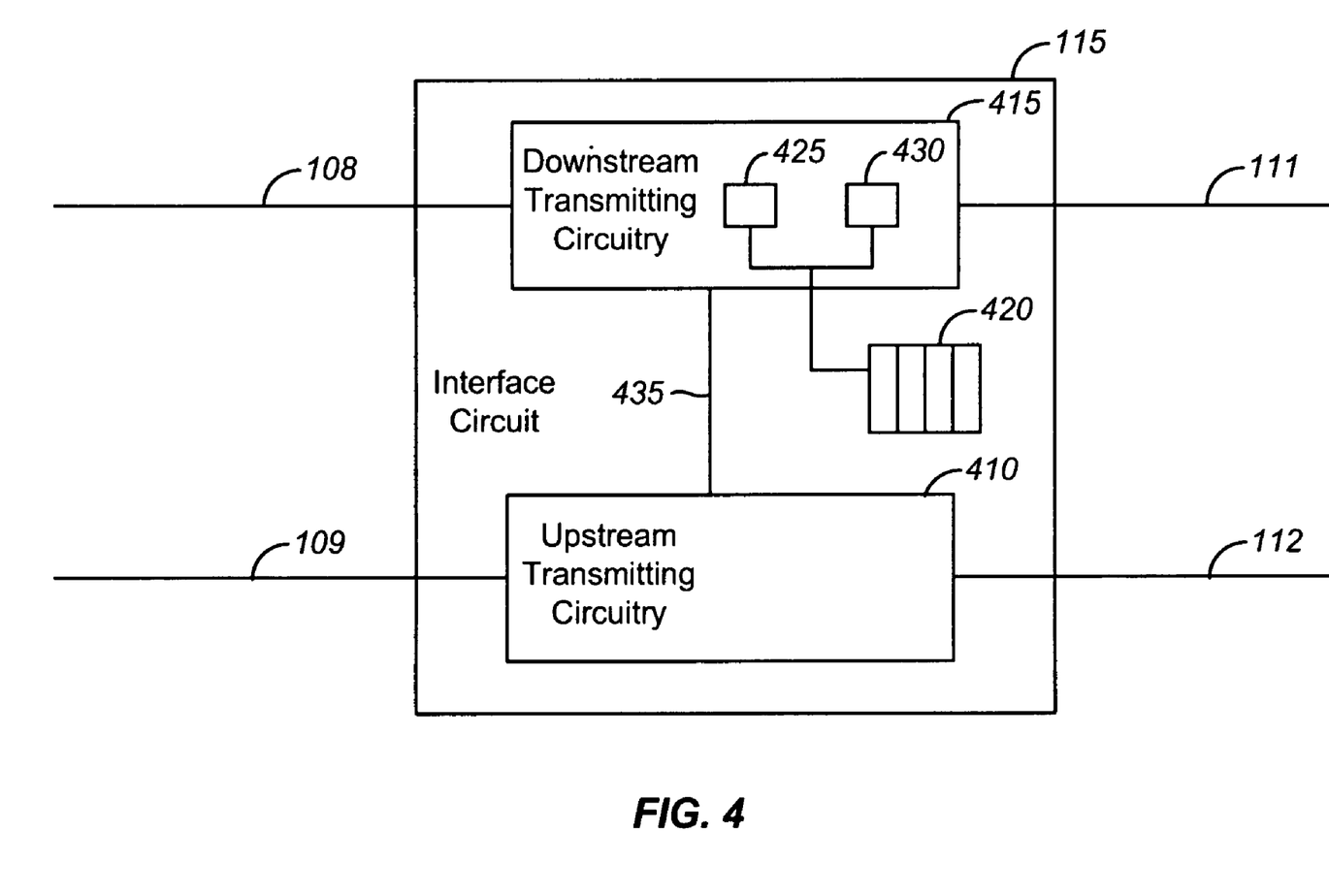
FIG. 4 illustrates a block diagram of components in an exemplary embodiment of an interface circuit in accordance with this invention.

FIG. 4 illustrates a block diagram of components of interface 115 operating in accordance with this invention. Interface 115 includes upstream transmitting circuitry 410 and downstream transmitting circuitry 415. One skilled in the art will recognize that interface 115 may be an FPGA, any type of programmable circuitry, and/or any combination of hardware and software that may be configured to perform the functions described.

Upstream transmitting circuitry 410 receives data from first circuit 110 via path 109. The rate of the data transmission is sped up by upstream transmitting circuitry 410 and the data is transmitted to second circuit 110 via path 112. Downstream transmitting circuitry 415 transmits signals to upstream transmitting circuitry 410 via path 435. Upstream transmitting circuitry 410 also generates pause frames and un-pause frames used to halt and begin transmissions from second circuit 110 in accordance with this invention. The generating of the pause and un-pause frames may be in response to signals received from downstream transmitting circuitry 415 and/or first circuit 105 as described below. transmitting circuitry 410 and the data is transmitted to second circuit 110 via path 112. Downstream transmitting circuitry 415 transmits signals to upstream transmitting circuitry 410 via path 420. Upstream transmitting circuitry 410 also generates pause frames and un-pause frames used to halt and begin transmissions from second circuit 110 in accordance with this invention. The generating of the pause and un-pause frames may be in response to signals received from downstream transmitting circuitry 415 and/or first circuit 105 as described below.

Downstream transmitting circuitry 415 receives data packets from second circuit 110 via path 111 and transmits data to first circuit 105 via path 108. A buffer 420 is used by downstream transmitting circuitry 415 to store data received from second circuit 110. Downstream transmitting circuitry 415 converts the data received from second circuit 110 at the second transmission rate to the first rate of first circuit 105. Maximum capacity threshold monitoring circuitry 425 monitors the amount of data stored in buffer 420 and generates a signal indicating the maximum capacity threshold has been exceeded. Minimal capacity threshold monitoring circuitry 430 monitors the amount of data stored in buffer 420 and generates a signal when the amount of data stored in the buffer is less than a minimal capacity threshold. One skilled in the art will recognize that for simplicity of this invention, the minimal capacity threshold and maximum capacity threshold may one threshold and the circuit merely signals when the one threshold is crossed. The signals will be used in a process of providing this invention as described below.

Figure 5:
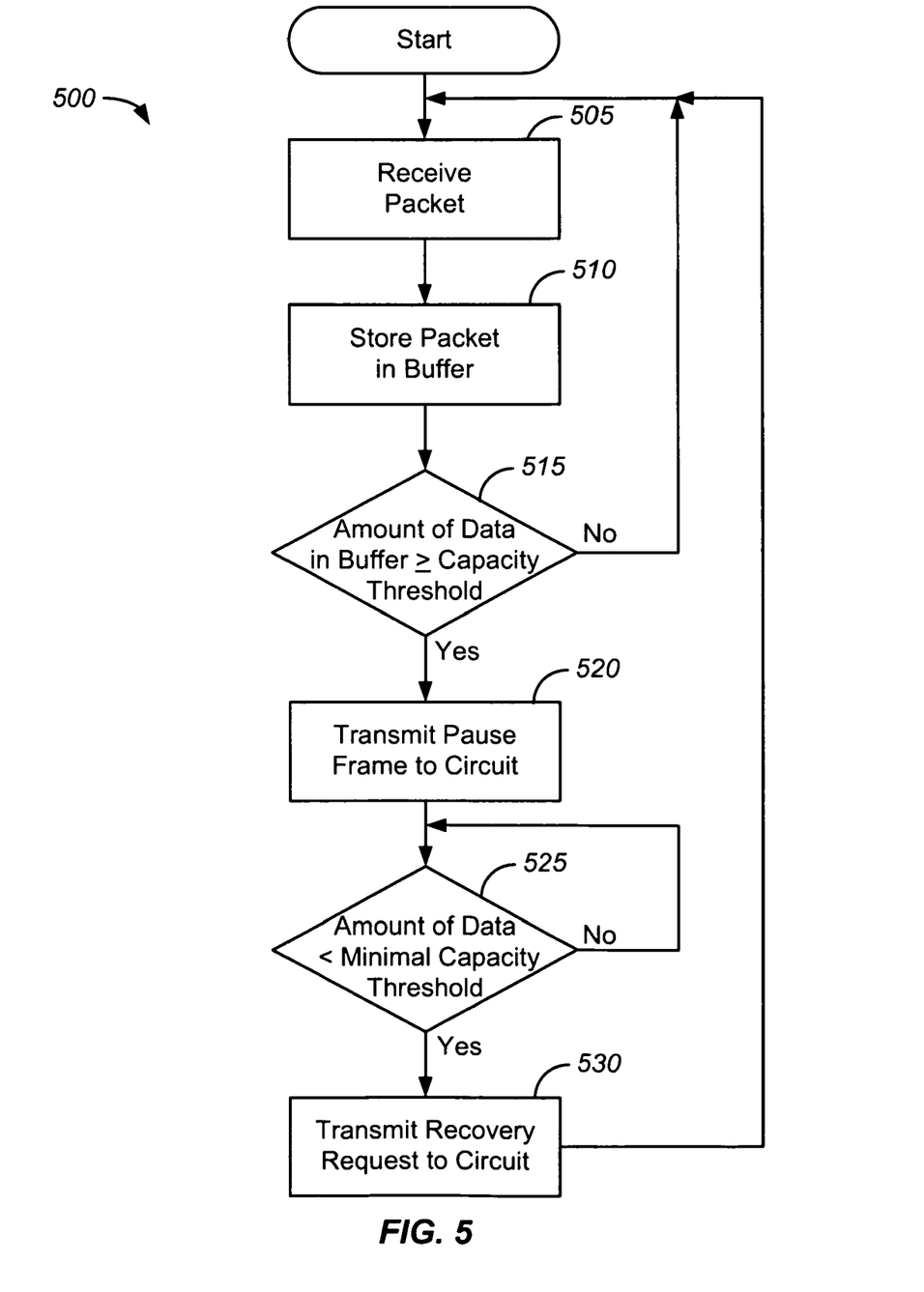
FIG. 5 illustrating a flow diagram of a process for transmitting data between the first and second circuit in accordance with an exemplary embodiment of this invention.

FIG. 5 illustrates a flow diagram of a process for transmitting data from second circuit 110 to first circuit 105 in accordance with an exemplary embodiment of this invention. Process 500 is a process for transmitting pause frames when a maximum capacity threshold of a buffer in the interface is surpassed. This process may require larger buffers in order to avoid overflow.

Process 500 begins in step 505 by receiving data from second circuit 110 to transmit to first circuit 105. One skilled in the art will recognize that typically data is received in packets and the data is handled on a per packet basis. In step 510, the data is stored in buffer 420. As the data is stored in buffer 420, buffer 420 is monitored to determine whether a maximum capacity threshold is surpassed in step 515. If the amount of data is greater than the maximum capacity threshold, interface 115 transmits a pause request to second circuit 110. In some embodiments, the pause request is a pause frame that is commonly used in the art. If the maximum capacity threshold is not exceeded, process 500 repeats from step 505.

In the exemplary embodiment, steps 515 and 520 are performed in the following manner. First, maximum capacity threshold monitoring circuitry 425 detects that the amount of data is greater than the maximum capacity threshold and generates a signal. The signal is transmitted to upstream transmitting circuitry 410. Upstream transmitting circuitry 410 generates and transmits a pause frame to second circuit 110.

In step 525, buffer 420 is monitored as downstream transmitting circuitry transmits data stored in buffer 420. When the data stored in buffer 420 is less than a minimal capacity threshold, interface 115 transmits a recovery request indicating second circuit 410 may again transmit data in step 530. One skilled in the art will recognize the recovery request may be a recovery frame as is common in the art. Other process 500 repeats from step 525.

In the preferred exemplary embodiment, steps 525 and 530 are performed in the following manner. First, minimum capacity threshold monitoring circuitry 430 detects that the amount of data is less than the minimum capacity threshold and generates a signal. In this exemplary embodiment, the minimum capacity threshold is also the maximum capacity threshold. The signal is transmitted to upstream transmitting circuitry 410. Upstream transmitting circuitry 410 generates and transmits a pause frame to second circuit 110.

Figure 6:
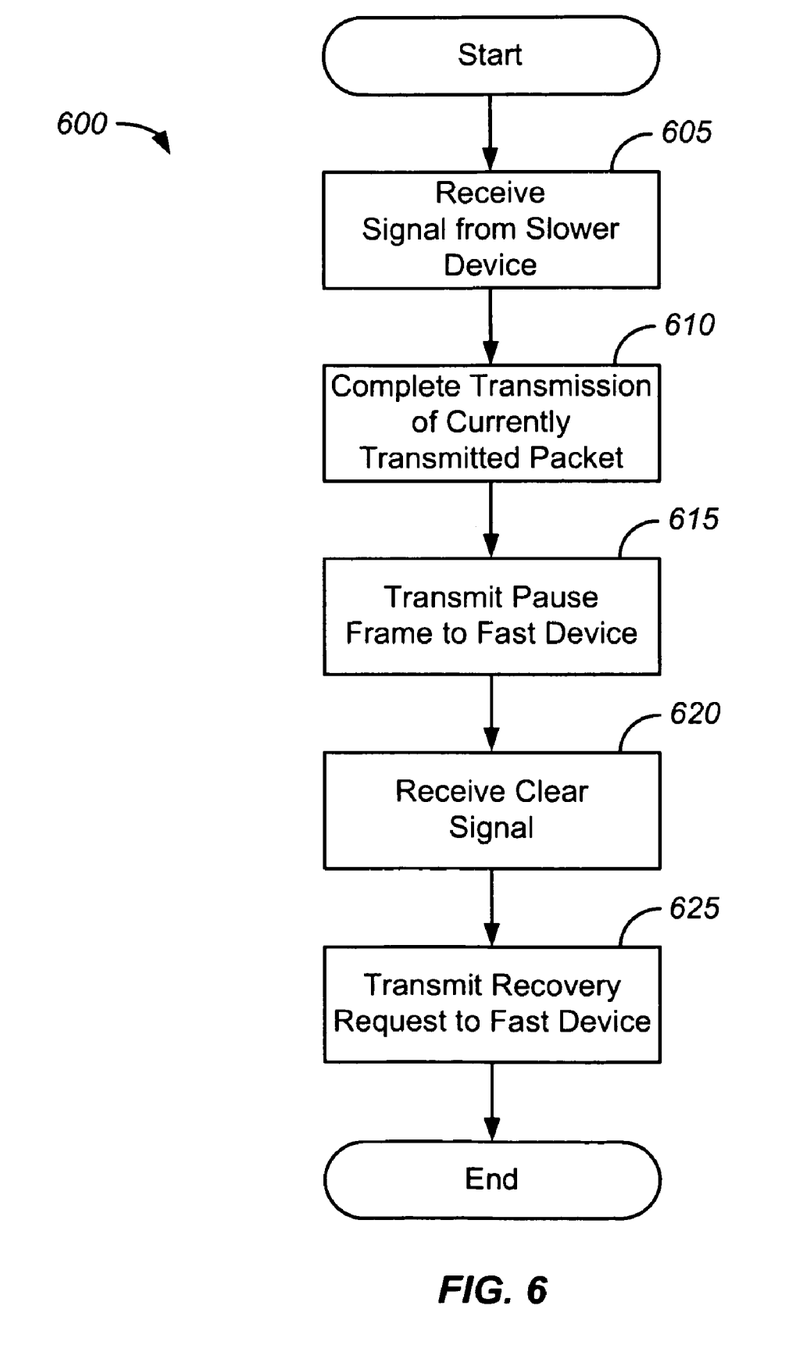
FIG. 6 illustrating a flow diagram of a process for transmitting data between the first and second circuit in accordance with an alternative exemplary embodiment of this invention.

FIG. 6 illustrates a flow chart for a second exemplary embodiment of this invention. Process 600 is a process for transmitting a pause request to second circuit 110 when an internal buffer in first circuit 105 has stored a maximum capacity of data. One skilled in the art will recognize that this process may operate in conjunction with either of the processes shown in FIGS. 5 and 7.

Process 600 begins in step 605 by interface 115 receiving a signal from first circuit 105 that buffer 220 has an amount of data stored that exceeds the maximum capacity threshold of the buffer. To minimize data loss, the maximum capacity threshold should be set so that the buffer still has enough capacity to store the longest possible data packet. When the maximum capacity threshold is exceeded, receiving circuitry may generate a signal and transmit the signal to transmitting circuit 210. Transmitting circuit 210 then generates a message and transmits the message to interface 115. In a preferred exemplary embodiment, the message is a CRS message as is known in the art.

In step 610, upstream transceiver circuitry 410 completes transmitting the current data packet being transmitted. After completing transmission of the packet, upstream transceiver circuitry 410 transmits a pause request to second circuit 110 in step 615. One skilled in the art will recognize that the pause request may be a pause frame commonly known in the art. Interface 115 then resumes transmitting data from first circuit 105 to second circuit 110.

In step 620, interface 415 receives a message indicating that the amount of data stored in buffer 220 is less than a minimal capacity threshold. One skilled in the art will recognize that the minimal threshold and maximum threshold may be one threshold in some embodiments. When the amount of data is less minimum capacity threshold, receiving circuitry may generate a signal and transmit the signal to transmitting circuit 210. Transmitting circuit 210 then generates a message and transmits the message to interface 115. In a preferred exemplary embodiment, the message is a CRS message as is known in the art.

In step 625, upstream transceiver circuitry 410 completes transmitting the current data packet being transmitted. After completing transmission of the packet, upstream transceiver circuitry 410 transmits a recovery request to second circuit 110 in step 625. One skilled in the art will recognize that the recovery request may be a recovery frame well known in the art. Interface 115 then resumes transmitting data from first circuit 105 to second circuit 110 and process 600 ends.

Figure 7:
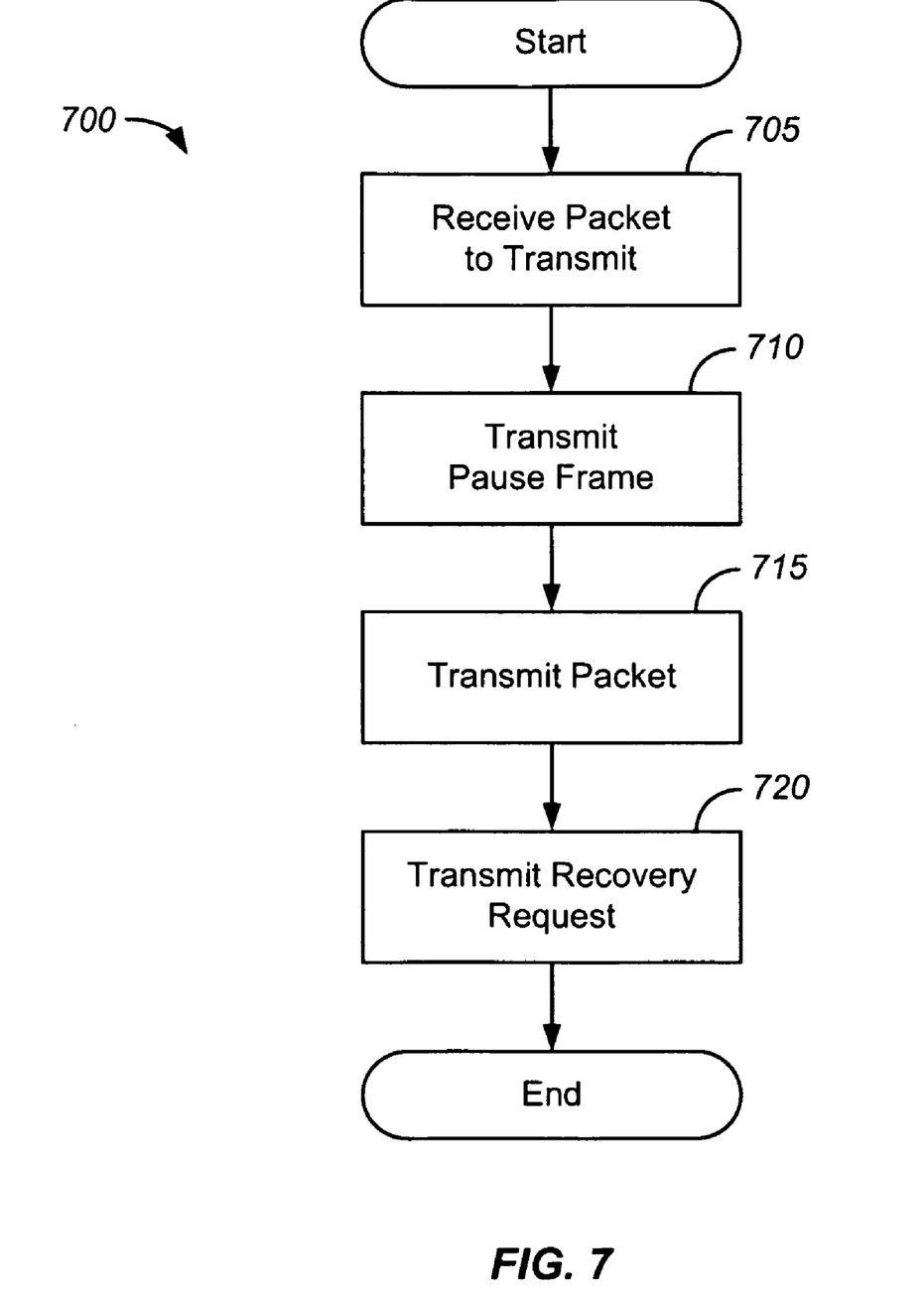
FIG. 7 illustrating a flow diagram of a process for transmitting data between the first and second circuits in accordance with this invention.

FIG. 7 illustrates a third exemplary process for transmitting data between a first and a second circuit having different transmission rates. In this embodiment, interface 115 transmits a pause frame before each packet transmitted to the second circuit from the first circuit. A second pause allowing the second circuit to resume transmitting is then transmitted after each packet transmitted. One skilled in the art will recognize that process 700 may be performed with either process 500 or 600 described above.

Process 700 begins in step 705 with upstream transceiver circuitry 410 of interface 115 receiving a packet to transmit to second circuit 110 from first circuit 105. In step 710, upstream transceiver circuitry transmits a pause request to second circuit 110. One skilled in the art will recognize that the pause request may be a pause frame well known in the art. In step 715, the received packet is then transmitted to second circuit 110. After the packet has been transmitted, upstream transceiver circuit transmits a recovery request indicating second circuit 105 may resume transmission. One skilled in the art will recognize that the recovery request may be a recovery frame well known in the art. Process 700 then ends to wait for another packet from first circuit 105 to transmit.

The above description describes exemplary embodiments of the invention as set forth below in the following claims. It is expected that those skilled in the art can and will design alternative embodiments of this invention as set forth in the following claims either literally or through the Doctrine of Equivalents.

What is claimed is:

1. A method for transmitting data between first circuitry that transmits data at a first speed and second circuitry that transmits data at a second speed, wherein said second speed is greater than said first speed, the method comprising:
    receiving data transmitted from said second circuitry to said first circuitry in a third circuit buffer at a third circuit; determining an amount of said data in said third circuit buffer is greater than a third circuit maximum capacity threshold;
    transmitting a pause request to said second circuitry responsive to a determination that said amount of said data is greater than said third circuit maximum capacity threshold;
    halting transmission of data from said second circuitry responsive to receiving said pause request in said second circuitry;
    receiving a transmission from said first circuitry indicating an amount of data, in a first circuitry buffer for storing received data in said first circuitry, is below a first circuitry minimum capacity threshold; and
    transmitting a transmit request to said second circuitry responsive to receiving said transmission.

2. The method of claim 1, wherein said pause request comprises a pause frame.

3. The method of claim 1, further comprising:
    determining said amount of said data in said third circuit buffer is less than a third circuit minimum capacity threshold;
    transmitting a recovery request to said second circuitry;
    receiving said recovery request in said second circuitry; and
    transmitting data from said second circuitry to first circuitry responsive to receiving said recovery request.

4. The method of claim 3, wherein said recovery request comprises a recovery frame.

5. The method of claim 1, wherein data is transmitted in packets and wherein said method further comprises:
    completing transmission of a currently transmitted packet responsive to receiving said pause request; and
    halting transmission of packets from said second circuitry to said first circuitry responsive to completing said transmission of currently transmitted packet.

6. The method of claim 5, further comprising:
    storing each packet generated for transmission in a second circuitry buffer in said second circuitry responsive to receiving said pause request;
    receiving a recovery request in said second circuitry; and
    transmitting each packet from said second circuitry buffer responsive to receiving said recovery request.

7. The method of claim 5, further comprising completing transmission of a currently transmitted packet responsive to a determination that said amount of data is greater than said third circuit maximum capacity threshold, said step of transmitting said pause request being responsive to said completing of said transmission of said current transmitted packet.

8. The method of claim 5, further comprising:
    transmitting a pause request to said second circuitry; transmitting a packet of data to said second circuitry responsive to transmitting said pause request; and
    transmitting a recovery request to said second circuitry responsive to transmitting said packet to said second circuitry.

9. The method of claim 1, further comprising:
    receiving a transmission from said first circuitry indicating an amount of data stored in said first circuitry buffer is greater than a first circuitry maximum capacity threshold; and
    transmitting a pause request to said second circuitry responsive to receiving said transmission.

10. A circuit for transmitting data between first circuitry that transmits data at a first rate and second circuitry that transmits data at a second rate, wherein said second rate is greater than said first rate, said circuit comprising:

a third circuit buffer for storing data;
circuitry configured to receive data transmitted from said second circuitry to said first circuitry;
circuitry configured to store said data received from said second circuitry in said third circuit buffer;
circuitry configured to read said data from said third circuit buffer and transmit said data to said first circuitry;
circuitry configured to determine an amount of said data in said third circuit buffer is greater than a third circuit maximum threshold capacity;
circuitry configured to transmit a pause request to said second circuitry responsive to a determination that said amount of said data is greater than said third circuit maximum capacity threshold;
circuitry configured to receive a transmission from said first circuitry indicating an amount of data, stored in a first circuit buffer for storing received data in said first circuitry, is greater than a first circuitry maximum capacity threshold; and
circuitry configured to transmit a pause request to said second circuitry responsive to receiving said transmission.

11. The circuit of claim 10, wherein said pause request comprises a pause frame.

12. The circuit of claim 10, further comprising:
circuitry configured to determine said amount of said data in said third circuit buffer is less than a third circuit minimum capacity threshold; and
circuitry configured to transmit a recovery request to said second circuitry responsive to a determination that said amount is less than said third circuit minimum capacity threshold.

13. The circuit of claim 12, wherein said recovery request comprises a recovery frame.

14. The circuit of claim 10, wherein said data is transmitted in packets and wherein said circuitry further comprises:
circuitry configured to receive packets transmitted from said first circuitry to said second circuitry;
circuitry configured to transmit said packets received from said first circuitry to said second circuitry; and
circuitry configured to complete transmission of a currently transmitted packet from said first circuitry to said second circuitry responsive to a determination that said amount of data is greater than said third circuit maximum capacity threshold, said circuitry configured to transmit said pause request being responsive to completion of said transmission of said current transmitted packet.

15. The circuit of claim 10, further comprising:
circuitry configured to receive a transmission from said first circuitry indicating an amount of said data in said first circuitry buffer is below a first circuitry minimum capacity threshold; and
circuitry configured to transmit a transmit request to said second circuitry responsive to receiving said transmission.

16. A system for transmitting data between two circuits, the system comprising:
a first circuit that transmits and receives data at a first rate;
a second circuit that transmits and receives data at a second rate, wherein said second rate is greater than said first rate;
an interface circuit that receives data packets transmitted from said second circuit to said first circuit, stores each packet received from said second circuit in an interface circuit buffer, determines when the amount of data stored in said interface circuit buffer is greater than an interface circuit maximum capacity threshold, transmits a first pause request to said second circuit responsive to a determination that said amount is greater than said interface circuit maximum capacity threshold, receives a transmission from said first circuit indicating an amount of data stored in a first circuit buffer for storing received data in said first circuit is greater than a first circuit maximum capacity threshold and transmits a second pause request to said second circuitry responsive to receiving said transmission, said second circuit being configured to receive said pause requests and halt transmission of packets to said first circuit in response to receiving one or more pause requests.

17. The system of claim 16, wherein said first and second pause requests are pause frames.

18. The system of claim 16, wherein said interface circuit determines said amount of said data in said interface circuit buffer is less than an interface circuit minimum capacity threshold and transmits a recovery request to said second circuitry responsive to a determination that said amount is less than said interface circuit minimum capacity threshold, and wherein said second circuit receives said recovery request and transmits data from said second circuitry to first circuitry responsive to receiving said recovery request.

19. The system of claim 18, wherein said recovery request comprises a recovery frame.

20. The system of claim 18, wherein data is transmitted in packets and wherein said second circuit completes transmission of a currently transmitted packet responsive to receiving said first or second pause request and halts transmission of packets from said second circuit to said first circuit responsive to completing said transmission of currently transmitted packet.

21. The system of claim 18, wherein said second circuit stores each packet generated for transmission to said first circuit in a second circuit buffer responsive to receiving said pause request, receives a recovery request from said interface circuit and transmits each packet from said second circuit buffer responsive to receiving said recovery request.

22. The system of claim 18, wherein said interface circuit completes transmission of a currently transmitted packet from said first circuit to said second circuit responsive to a determination that said amount of data stored in said interface circuit buffer is greater than said interface circuit maximum capacity threshold and transmits said first pause request responsive to said completing of said transmission of said current transmitted packet.

23. The system of claim 18, wherein said interface circuit transmits a third pause request to said second circuit, transmits a packet of data to said second circuit responsive to transmitting said third pause request and transmits a transmit request to said second circuit responsive to transmitting said packet to said second circuitry.

24. The system of claim 16, wherein said interface circuit receives a transmission from said first circuit indicating an amount of said data in said first circuit buffer for storing received data in said first circuit is below a first circuit minimum capacity threshold and transmits a transmit request to said second circuitry responsive to receiving said transmission.

25. A circuit for transmitting data between first circuitry that transmits data at a first rate and second circuitry that transmits data at a second rate, wherein said second rate is greater than said first rate, said circuit comprising:
means to transmit data between said first circuitry and said second circuitry;

means to determine that said data has been transmitted at a rate that exceeds a third circuit maximum rate threshold;

means to transmit a pause request to said second circuitry responsive to a determination that said data has been transmitted at a rate that exceeds a third circuit maximum rate threshold at said third circuit;

means to receive a first transmission from said first circuitry indicating that said data has been transmitted at a rate that is below a first circuitry minimum rate threshold at said first circuitry; and means to transmit a transmit request to said second circuitry responsive to receiving said first transmission.

26. The circuit of claim 25, further comprising:

means to determine that said data has been transmitted at a rate that is below a third circuit minimum rate threshold at the circuit; and means to transmit a recovery request to said second circuitry responsive to a determination that said data has been transmitted at a rate that is below a third circuit minimum rate threshold at the circuit.

27. The circuit of claim 25, wherein said data is transmitted in packets and wherein said circuit further comprises:

means to receive packets transmitted from said first circuitry to said second circuitry;

means to transmit said packets received from said first circuitry to said second circuitry;

means to complete transmission of a currently transmitted packet from said first circuitry to said second circuitry responsive to a determination that said amount of data is greater than said third circuit maximum capacity threshold; and means to transmit said pause request being responsive to completion of said transmission of said current transmitted packet.

28. The circuit of claim 25, further comprising:

means to receive a second transmission from said first circuitry indicating that said data has been transmitted at a rate that exceeds a first circuitry maximum rate threshold at said first circuitry; and means to transmit a second pause request to said second circuitry responsive to receiving said second transmission.

* * * * *

UNITED STATES PATENT AND TRADEMARK OFFICE
CERTIFICATE OF CORRECTION

PATENT NO. : 7,602,724 B2　　　　　　　　　　　　　　　　　　　　　　　Page 1 of 1
APPLICATION NO. : 11/273998
DATED : October 13, 2009
INVENTOR(S) : Galimberti et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 873 days.

Signed and Sealed this

Fifth Day of October, 2010

David J. Kappos
*Director of the United States Patent and Trademark Office*